Jan. 19, 1960 P. KUSTUSCH 2,921,375
DIAL DEPTH GAUGE
Filed Nov. 6, 1956 2 Sheets-Sheet 1
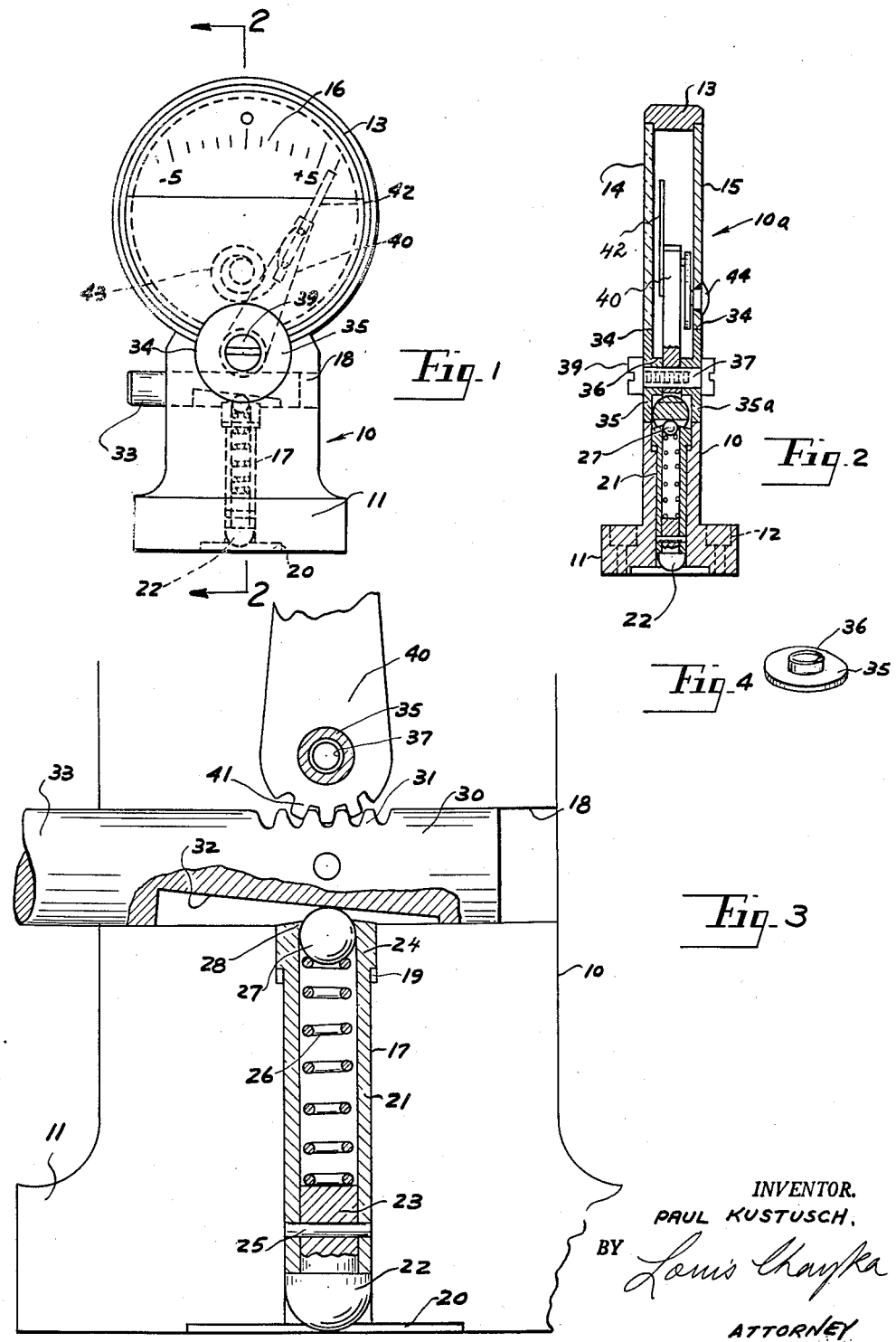
INVENTOR.
PAUL KUSTUSCH,
BY Louis Chayka
ATTORNEY Jan. 19, 1960 P. KUSTUSCH 2,921,375
DIAL DEPTH GAUGE Filed Nov. 6, 1956 2 Sheets-Sheet 2

INVENTOR.
PAUL KUSTUSCH.
BY Louis Chayka
ATTORNEY

United States Patent Office 2,921,375
Patented Jan. 19, 1960

2,921,375

DIAL DEPTH GAUGE

Paul Kustusch, Grosse Pointe, Mich., assignor to Carl L. Holmes, Willard F. Holmes, Wilbur L. Jaycox and A. Monroe Courtright, Franklin County, Ohio Application November 6, 1956, Serial No. 620,718

8 Claims. (Cl. 33—172)

The invention pertains to a novel type of gauge employing an oblong, wedge-like member moving horizontally, the member including a sloping undersurface. Bearing against said surface from below is a vertically-slidable pin. As the level to which the upper end of the pin may reach varies with the depth of the depression of a bore which is to be probed by said pin or by an intermediate member actuating said pin, the extent of the longitudinal movement of the wedge will be controlled by said pin. The wedge-like member is provided with rack teeth in engagement with a revoluble member which includes a pointer. A dial associated with the pointer and provided with suitable indicia serves to indicate the extent of said longitudinal movement of the wedge and, thereby, the depth of the respective depression.

The gauge is of the type which may be best used to check the accuracy of a depression, recess, or bore in items made in mass production, and has the advantage that it is semi-automatic.

All that is needed to secure the reading on the dial of the depth of the respective bore is to have the gauge set on a flat surface at the level from which the depth is to be measured and to push the wedge, by a conveniently located fingerpiece, to the limit of its longitudinal movement inwardly. On release of the fingerpiece the wedge will automatically reverse its movement and actuate the revoluble member with the pointer mounted thereon. However, the wedge will move only to the distance at which its slanting face will encounter the vertical pin resting on the bottom of the depression or on an auxiliary member resting on said bottom.

Another advantage of the gauge lies in the fact that the position of the dial needs no adjustment. The gauge is made in such a manner that the lower end of the pin normally projects slightly below the flat undersurface of the base of the gauge so that when the gauge is placed on a flat plate it will ride on said pin. On a manual shift of the wedge inwardly, the base will come into an intimate contact with the surface of the plate, whereupon the pointer will indicate a zero position. It is from this zero marking that the pointer, during the operative use of the gauge, will swing in either direction, depending on whether the respective depth to be gauged is excessive or insufficient.

I shall now describe my invention with reference to the accompanying drawings in which:

Fig. 1 is a front elevational view of the gauge;

Fig. 2 is a vertical sectional view of the gauge on line 2—2 of Fig. 1;

Fig. 3 is a fragmentary but enlarged front elevational view of operative elements of the gauge, with parts shown in section;

Fig. 4 is a perspective view of an element of the gauge;

Similar numerals refer to similar parts throughout the several views.

Figures 5, 6:
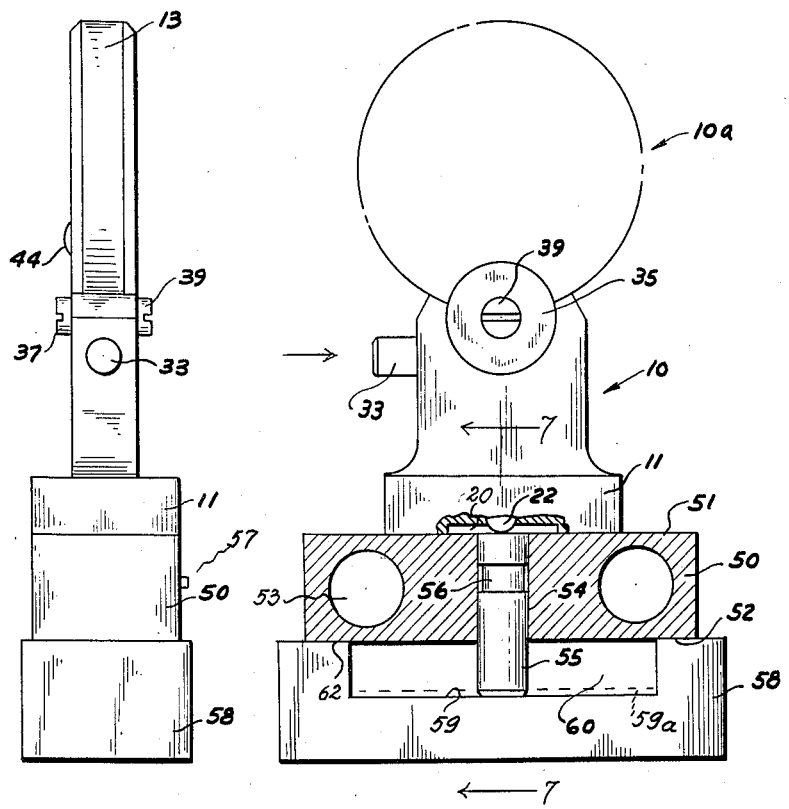
Fig. 5 is a front elevational view of the gauge upon a mounting block to which the gauge is secured, the view disclosing the gauge set in its operative position over a recessed portion of a horizontal bar.
Fig. 6 is an end view of the assembly shown in Fig. 5.
Figure 7:
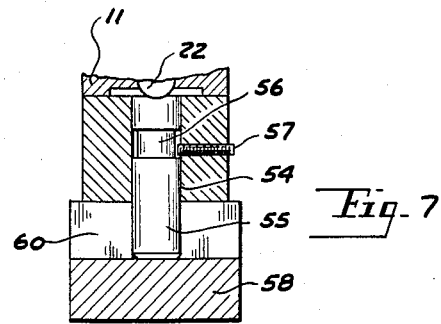
Fig. 7 is a vertical sectional view on line 7—7 of Fig. 5.

The gauge includes a vertical stand, generally indicated by numeral 10, and an integrally-connected flat case, generally marked 10a, at the top of said stand. The stand is provided with a horizontal base 11 which contains a plurality of holes 12 for application of screws to which I shall refer in the course of this specification.

The case at the top of the stand is defined by a circular wall 13, a vertical back wall 15, and a glass pane 14 forming the front wall of the casing, the glass pane being framed by said wall. The inner surface of the back wall serves as a dial, bearing thereon calibrations and indicia 16 arranged in an arc, as best shown in Fig. 1.

The stand contains a vertical bore 17 which extends from the base upwardly to a horizontal slideway 18 in the upper portion of the stand, the slide extending through the stand from one side of it to another parallel to the front face thereof. At its upper end opening into said slideway, the bore is expanded radially, as shown at 19. At the lower end said bore 17 opens into a flat-topped recess 20 in the underface of the base. Slidably disposed within the bore is a tubular member or pin 21 which at the lower end terminates with a semi-spherical gland 22 mounted upon a shank 23 which fits axially into the lower end portion of the tubular member 21. A cross-pin 25, thrust through the wall of the rod and through the shank 23, holds the gland against displacement.

At the upper end the wall of the tubular member is expanded to form a shoulder 24 which fits into the expanded portion 19 of the bore 17. Located within the tubular member 21 and bearing at the lower end against said shank 23 is a coiled spring 26 which at the upper end bears against a ball 27 which is held against displacement outwardly by an annular lip 28 drawn from the upper rim portion of said member 21. The ball, as shown in Fig. 3, projects above the upper end of said member 21.

Disposed within the slideway 18 is a rack 30, the teeth of which, marked 31, project upwardly from the body of the rack as it is disposed horizontally. A portion of the body of the rack, on its underside, is cut out to form a face 32 slanting lengthwise with respect to the rack, said face bearing, from above, against said ball 27. One end of the rack projects outwardly from the slideway and serves as a finger-piece 33 for the operation of said rack. At its upper portion, above the slideway 18, the stand 10 contains a hole 34 extending at right angle to said slideway.

Fitting into the hole from the front of the stand is a disk 35. A similar disk 35a fits into the hole from the opposite or rear of the stand. Each of the disks contains a tubular hub portion 36. The two hub portions serve as bearings for a hollow arbor 37 which is threaded inwardly for reception of a screw 39, as best shown in Fig. 2. Mounted upon the arbor is a radially-disposed pointer 40, the pointer including a collar-like portion which embraces said arbor and is provided with teeth 41 in a pinion-like arrangement for engagement with the teeth 30 of the rack. Attached to the free end of the pointer is a needle 42 which is long enough to reach the indicia on the back wall of the casing 10a.

Anchored at one end to a stationary, button-like member 44 which is secured within the back wall 15 of the case 10a is a spirally-looped spring 43 which at the other end is secured to the pointer to bias said pointer for a swing in a clockwise direction to the limit of its movement.

For its operative use the gauge is preferably used in conjunction with a mounting block 50 having a horizontal upper face 51 and a parallel underface 52. For the sake of reducing its weight, the block has two large apertures 53. The midportion of the block contains a smooth vertical bore 54, and located therein, for a vertical sliding movement, is a rod 55. The rod is provided, midway its length, with an annular recess 56, and projecting into the recess, without bearing against the body of the rod, is a screw 57. This is to limit the extent of the vertical movement of the rod in either direction, upwardly or downwardly.

The gauge is secured to the block by means of screws fitting into holes 12 in the base 11 of the gauge, and is located on the block in such a position that the gland 22 of the vertically-slidable pin 17 will bear against the top of the floating rod 55.

In order to describe the manner in which the gauge may be used in ascertaining the depth of a particular bore or recess, I will refer to a member 58 which will exemplify an item to be produced in large numbers. The member, as will be noted, has a recessed portion 60 defined, in part, by a flat bottom 59, which bottom is to be "$n$" inches from the top level 62 of said member 58.

For this purpose the floating rod 55 would be made in such a length as to reach from the bottom 59 of the depression at its desired level to the level of the underside of the base 11 of the gauge. The recess 20 in the base of the stand 10 will allow movement of the rod 55 upwardly.

The position of the vertical floating rod 55 with respect to the member 58 in which the depression 60 is of the right or standard depth "$n$" is shown in Fig. 5. Such being the case, the lower end of the gland 22 and the top of the pin 55 will be at the level of the underface of the base of the gauge, and the pointer will indicate the zero position on the dial.

It will be assumed now that in another member like said member 58 the bottom of the depression will be at a level above the bottom 59 and that it will reach a dotted line marked 59$a$. In such a case, while the gauge is in the same position as shown in Fig. 5, the rack would be first pushed in in the direction of the arrow to the limit of the movement of the rack. The rack, actuating the pointer, would swing it to the extreme position left of the zero mark. Now, on release of pressure upon the fingerpiece endwise, the pointer, actuated by the spring 43, would swing back, shifting the rack in its reverse movement to the limit permitted by the rise of the upper end of the floating rod 55, due to the raised level of the bottom of the recess 60. The extent of the rise of the level of the bottom above the norm would be indicated on the plus side of the dial to the right of the zero mark in such units of measurement as thousandths of an inch. Conversely, if the bottom of the depression were to be below the norm, the pointer would swing to the minus side of the dial, to the left of the zero mark.

After having described my improvement, what I wish to claim is as follows:

1. A gauge having a vertical stand including a flat base, said stand containing a horizontal slideway open at one end and a vertical bore opening at the upper end into said slideway and opening at the lower end into said base, a rack disposed in the slideway for longitudinal movement therein, one end of the rack extending outwardly from the slideway and forming a fingerpiece for the operation of said rack, the underside of the rack being defined by a longitudinally-slanting face, a sliding pin located within the bore, the upper end of the pin being adapted to bear against the slanting face of the rack while the lower end of the pin extends downwardly in the stand, a dial mounted upon the upper end of the stand, a pivoted pinion actuated by the rack and including a radial pointer adapted to be moved upon the face of the dial, and spring means normally holding the rack in a partly-extended position outwardly, but adapted upon the inward push of the rack, manually, to shift the rack back for encounter of its slanting face with the top of the pin.

2. A depth gauge having a vertical stand including a flat base, said stand containing a horizontal slideway open at one end and a vertical bore opening at the upper end into said slideway and opening at the lower end into said base, a rack disposed in the slideway for longitudinal movement therein, one end of the rack extending outwardly from the slideway and forming a fingerpiece for the operation of said rack, the underside of the rack being defined by a longitudinally-slanting face, a sliding pin located within the bore, the upper end of the pin terminating with a yieldingly mounted ball adapted to bear against the slanting face of the rack, while the lower end of the pin is adapted to be supported directly or by intermediate means upon the bottom of the depression to be gauged for depth, a dial mounted upon the upper end of the stand, a pivoted pinion in mesh with the rack, and a pointer extending radially therefrom and adapted to be moved upon the face of the dial, and spring means acting upon the rack from its inwardly-pushed position outwardly for encounter of its slanting face with the ball of the pin at a level corresponding to the bottom of said depression.

3. A depth gauge having a vertical stand including a flat base, said stand containing a horizontal slideway open at one end and a vertical bore opening at the upper end into said slideway and opening at the lower end into said base, a rack disposed in the slideway for longitudinal movement therein, one end of the rack extending outwardly from the slideway and forming a fingerpiece for the operation of said rack, the underside of the rack being defined by a face slanting downwardly in the direction away from the fingerpiece, a sliding depth-probing pin located within the bore, the upper end of the pin being adapted to bear against said slanting face, while the lower end of the pin extends downwardly through the base, a calibrated dial mounted on the stand, a pointer operated by the rack for a movement along the calibrations, spring means to move the rack outwardly in the direction of the open end of the slideway for encounter of said slanting face with the upper end of the rod.

4. A depth gauge having a vertical stand including a flat base provided with an upwardly-recessed portion, said stand containing a horizontal slideway open at one end and a vertical bore opening at the upper end into said slideway and opening at the lower end into said recessed portion of the base, a rack disposed in the slideway for longitudinal movement therein, one end of the rack extending outwardly from the slideway and forming a fingerpiece for the operation of said rack, the underside of the rack being defined by a face slanting downwardly in the direction away from the fingerpiece, a pin located within the bore for a sliding movement therein, the upper end of the pin being adapted to bear against the slanting face of the rack while the lower end of the pin extends into the recess in the base of the stand, a calibrated dial on the stand, a pivoted pinion in mesh with the rack, a radial pointer extending from the pinion for movement along the calibrations of the dial, a mounting block under the base of the stand, the block having a horizontal upper surface and a horizontal undersurface and being provided with a vertical bore in alinement with the bore in the stand, a floating rod in the bore of the block, the rod, in its normal position, extending to the top of the level of the block for contact with the lower end of the pin in the stand, and extending at its lower end into a recess to be gauged for depth, and spring means to bias the rack for endwise movement outwardly of the stand for encounter of said slanting face with the top of the pin in said stand when the pin has been raised by the floating rod resting on the bottom of the recess to be gauged.

5. A gauge comprising a body having a flat reference surface thereon and provided with a slideway substantially parallel to said reference surface and a bore substantially perpendicular to said reference surface extending from said slideway through said reference surface, an indicator pin slidably disposed in said slideway, said indicator pin having a longitudinally-slanting face registering with said bore, a probe pin slidably disposed in said bore, one end of said probe pin being adapted to extend into said slideway and to bear against said slanting face of said indicator pin while the opposite end of said probe pin bears against a surface the position of which is to be gauged, means for manually moving said indicator pin longitudinally for encounter of said slanting face with said one end of said probe pin, and means including a plurality of indicia for indicating the position of said indicator pin relative to said body and thereby indicating the position of said probe pin relative to said reference surface when said one end bears against said slanting face.

6. A gauge comprising a body having a flat reference surface thereon and provided with a slideway substantially parallel to said reference surface and a bore substantially perpendicular to said reference surface extending from said slideway through said reference surface, an indicator pin disposed in said slideway for longitudinal movement therein, said indicator pin having a longitudinally-slanting face registering with said bore, a probe pin slidably disposed in said bore, one end of said probe pin being adapted to extend into said slideway and to bear against said slanting face of said indicator pin while the opposite end of said probe pin bears against a surface the position of which is to be gauged, one end of said indicator pin extending outwardly from said slideway and forming a fingerpiece for manually moving said indicator pin longitudinally away from contact with said probe pin, spring means for moving said indicator pin longitudinally, in the absence of counterpressure on said fingerpiece, for contact of said slanting face with said one end of said probe pin, and means including a plurality of indicia for indicating the position of said indicator pin relative to said body and thereby indicating the position of said probe pin relative to said reference surface when said one end bears against said slanting face.

7. A depth gauge comprising a body having a flat base and provided with a horizontal slideway within its upper portion and a vertical bore extending from said slideway downwardly through said base, an indicator pin slidably disposed in said slideway, said indicator pin having its lower portion defined by a longitudinally-slanting face, a depth-probing vertical pin slidably disposed in said bore, the upper end of said vertical pin being adapted to bear against said slanting face of said indicator pin while the lower end of said vertical pin may extend through said base, means including a plurality of indicia for indicating the position of said indicator pin relative to said body and thereby indicating the position of said vertical pin relative to said base when said upper end bears against said slanting face, and means for manually moving said indicator pin longitudinally for encounter of said slanting face with said upper end of said vertical pin at the level determined by the depth to be gauged.

8. A depth gauge comprising a body having a flat base and provided with a horizontal slideway within its upper portion and a vertical bore extending from said slideway downwardly through said base, an indicator pin disposed in said slideway for longitudinal movement therein, said indicator pin having its lower portion defined by a longitudinally-slanting face, a depth-probing vertical pin slidably disposed in said bore, the upper end of said vertical pin being adapted to bear against said slanting face of said indicator pin while the lower end of said vertical pin may extend through said base, means including a plurality of indicia for indicating the position of said indicator pin relative to said body and thereby indicating the position of said vertical pin relative to said base when said upper end bears against said slanting face, one end of said indicator pin extending outwardly from said slideway and forming a fingerpiece for manually moving said indicator pin longitudinally away from contact with said vertical pin, and spring means for moving said indicator pin longitudinally, in the absence of counter-pressure on said fingerpiece, for contact of said slanting face with said upper end of said vertical pin at the level determined by the depth to be gauged.

References Cited in the file of this patent

UNITED STATES PATENTS

| 526,105 | Hollister | Sept. 18, 1894 |
| 1,422,576 | Humphreys | July 11, 1922 |
| 1,725,898 | Chaperlo et al. | Aug. 27, 1929 |
| 2,212,306 | Schwartz | Aug. 20, 1940 |

FOREIGN PATENTS

| 815,016 | France | Mar. 30, 1937 |